Patented Mar. 30, 1948

2,438,883

UNITED STATES PATENT OFFICE 2,438,883

PROCESS OF MAKING RIBONOLACTONE

Leo A. Flexser, Elizabeth, N. J., assignor to Hoffmann-La Roche Inc., Nutley, N. J., a corporation of New Jersey No Drawing. Application April 2, 1946,
Serial No. 659,138

7 Claims. (Cl. 260—344)

This invention relates to a novel method of preparing ribonolactone, an important intermediate in the synthesis of riboflavin.

I have discovered that when ribonic acid is dissolved in a suitable organic solvent containing a small amount of a strong acid, lactonization of the acid to ribonolactone is catalyzed, the lactone being formed quantitatively in a short time even at room temperature.

Various organic solvents may be employed. It is preferable to employ a solvent which maintains a solution during the reaction, and which is inert (non-reactive) toward the reaction composition.

Suitable solvents include lower aliphatic alcohols, such as methanol and ethanol, which are particularly suitable for dissolving ribonic acid.

Various strong acids may be employed as catalysts. I prefer a strong mineral acid, such as sulfuric acid, hydrochloric acid, or phosphoric acid. Organic acids, such as trichloracetic acid and sulfonic acids, e. g. benzene sulfonic acid, may be used. The concentration of acid in the solvent is not critical, being variable over wide limits without seriously affecting the rate or completeness of lactonization. However, excessive amounts of certain acids, such as sulfuric acid, which may cause charring, should be avoided.

When a solvent, such as methanol, is employed in which ribonolactone is very soluble, it is convenient for the isolation of a crystalline lactone product to add, subsequently, a higher boiling organic solvent in which the lactone is less soluble, e. g. n-butanol. This second solvent is added after the lactonizing period; and then the first solvent is removed by evaporation in vacuo, after which good crystallization of the lactone is readily effected. However, in many cases, the initial lactonized solution is sufficiently pure for further processing without intermediate isolation of a crystalline lactone.

The following example illustrates a method of operation of my invention when a crystalline product is desired.

Example

To a solution of 230 grams of calcium ribonate in 750 ml. of water are added a solution of 63 grams of oxalic acid in 250 ml. water. The precipitated calcium oxalate is filtered off from the aqueous ribonic acid solution. The solution is evaporated in vacuo until a thick sirup of ribonic acid remains. The residue is dissolved in 200 ml. methanol containing about 2 grams of sulfuric acid (95 percent) and allowed to stand at room temperature for six hours, whereby lactonization takes place. There are then added 500 ml. n-butanol and the mixture is distilled in vacuo until about 300 ml. of distillate have been collected. Ribonolactone usually crystallizes spontaneously during the course of this distillation, but, if not, crystallization may be induced by seeding. The crystallizing mixture is then refrigerated for several hours. The product is filtered, washed with cold butanol, and dried in vacuo. The ribonolactone, thus produced, has a minimum melting point of 80° C. characteristic of a highly pure product.

I claim:

1. The process which comprises lactonizing ribonic acid to ribonolactone in an organic solvent, which solvent contains a strong acid as a catalyst for the lactonization, the solvent being a lower aliphatic alcohol.

2. The process of claim 1 in which the solvent is methanol.

3. The process of claim 1 in which the solvent is ethanol.

4. The process of claim 1 in which the acid is a strong mineral acid.

5. The process of claim 1 in which the acid is sulfuric acid.

6. The process of claim 1 in which the solvent is ethanol and the acid is sulfuric acid.

7. In the process of preparing ribonolactone from ribonic acid in a lower aliphatic alcohol, the step of subjecting the ribonic acid to the action of a strong acid.

LEO A. FLEXSER.

REFERENCES CITED

The following references are of record in the file of this patent:

UNITED STATES PATENTS

| Number | Name | Date |
| --- | --- | --- |
| 2,102,380 | Pasternack | Dec. 14, 1937 |

OTHER REFERENCES

Levene and Simms, J. Biol. Chem. 65, 31 (1925).

Hedenberg, J. Am. Chem. Soc. 37, 345 (1915).